US009458920B2

(12) United States Patent
Lannutti (10) Patent No.: US 9,458,920 B2
(45) Date of Patent: Oct. 4, 2016

(54) REUSABLE DUST CAP FOR A PULLEY ASSEMBLY

(71) Applicant: Anthony Eugene Lannutti, Fayetteville, AR (US)

(72) Inventor: Anthony Eugene Lannutti, Fayetteville, AR (US)

(73) Assignee: DAYCO IP HOLDINGS, LLC, Troy, MI (US)

(*) Notice: Subject to any disclaimer, the term of this patent is extended or adjusted under 35 U.S.C. 154(b) by 160 days.

(21) Appl. No.: 14/268,246

(22) Filed: May 2, 2014

(65) Prior Publication Data

US 2015/0316137 A1 Nov. 5, 2015

(51) Int. Cl.
*F16H 55/36* (2006.01)

(52) U.S. Cl.
CPC .................................... *F16H 55/36* (2013.01)

(58) Field of Classification Search
CPC ................................. F16H 1/00; F16H 55/36
USPC ........................................................ 474/144
See application file for complete search history.

(56) References Cited

U.S. PATENT DOCUMENTS

| 1,787,459 | A | 1/1931 | Tawresey |
| 2,622,934 | A | 12/1952 | Phelps |
| 2,747,687 | A | 5/1956 | Carter |
| 2,837,376 | A | 6/1958 | Bruno |
| 3,177,020 | A | 4/1965 | Dumpis |
| 3,494,681 | A | 2/1970 | Anderson et al. |
| 3,519,316 | A | 7/1970 | Göthberg |
| 3,537,725 | A | 11/1970 | Frost |
| 3,770,992 | A | 11/1973 | Veglia |
| 3,792,912 | A | 2/1974 | Howe, Jr. et al. |
| 3,899,226 | A | 8/1975 | Frost et al. |
| 4,025,132 | A | 5/1977 | Watanabe |
| 4,054,335 | A | 10/1977 | Timmer |
| 4,113,328 | A | 9/1978 | Vander Meulen |
| 4,318,495 | A | 3/1982 | Wood |
| 4,342,490 | A | 8/1982 | Swinley |
| 4,368,933 | A | 1/1983 | Motsch |
| 4,384,387 | A | 5/1983 | Pachuta |
| 4,481,977 | A | 11/1984 | Maldavs |
| 4,533,265 | A | 8/1985 | Woodbridge |
| 4,592,666 | A | 6/1986 | Jörnhagen |
| D285,247 | S | 8/1986 | Jörnhagen |

(Continued)

FOREIGN PATENT DOCUMENTS

| CA | 2383438 | 10/2002 |
| CA | 2766928 | 2/2011 |

(Continued)

OTHER PUBLICATIONS

PCT, International Search Report and Written Opinion, PCT/US2015/028130 (Sep. 17, 2015).

*Primary Examiner* — Michael Mansen
*Assistant Examiner* — Mark K Buse
(74) *Attorney, Agent, or Firm* — Thompson Hine LLP (57) ABSTRACT

A dust cap for sealing engagement with an opening of a member is disclosed. The dust cap is removable from the opening of the member by a tool. The dust cap includes a body and an elastomeric portion. The body defines an outer perimeter, an inner surface, an outer surface, and a recess disposed along the outer surface. The recess is shaped to receive a portion of the tool. The elastomeric portion is located around the outer perimeter of the body. The elastomeric portion is sealingly engageable with the opening of the body member.

11 Claims, 8 Drawing Sheets

(56) References Cited

U.S. PATENT DOCUMENTS

| | | | |
|---|---|---|---|
| 4,687,349 A | 8/1987 | Pachuta | |
| 4,755,067 A | 7/1988 | Asberg et al. | |
| 4,792,243 A * | 12/1988 | Takeuchi | F16C 33/6618 |
| | | | 277/402 |
| 4,793,457 A | 12/1988 | Siewert et al. | |
| 4,916,750 A | 4/1990 | Scott | |
| 4,960,335 A | 10/1990 | Otto et al. | |
| 5,005,992 A * | 4/1991 | Dreschmann | F16C 23/086 |
| | | | 384/482 |
| 5,040,250 A * | 8/1991 | Barnes | A61H 33/6063 |
| | | | 138/104 |
| 5,156,440 A * | 10/1992 | Vidwans | B60N 2/4814 |
| | | | 297/410 |
| 5,172,917 A | 12/1992 | du Gay | |
| 5,190,502 A | 3/1993 | Gardner et al. | |
| 5,380,103 A | 1/1995 | Lederman | |
| 5,620,385 A | 4/1997 | Cascionale et al. | |
| 5,642,882 A * | 7/1997 | Guerzini | A63B 60/16 |
| | | | 473/300 |
| 5,711,393 A | 1/1998 | Gage | |
| 5,798,589 A | 8/1998 | Ohi et al. | |
| 5,860,748 A * | 1/1999 | Okumura | F16C 33/7853 |
| | | | 277/562 |
| 5,947,612 A | 9/1999 | Dennison Buck et al. | |
| 5,954,849 A | 9/1999 | Berkhoel et al. | |
| 6,309,247 B1 | 10/2001 | Wang | |
| 6,575,860 B2 * | 6/2003 | Dutil | F16H 7/1218 |
| | | | 474/135 |
| 6,854,893 B2 * | 2/2005 | Schmidt | F16C 13/006 |
| | | | 384/477 |
| 6,863,631 B2 | 3/2005 | Meckstroth et al. | |
| 7,011,221 B2 | 3/2006 | Smith et al. | |
| 7,011,593 B2 | 3/2006 | Schenk et al. | |
| 7,448,807 B2 * | 11/2008 | Schenk | F16C 13/006 |
| | | | 384/417 |
| 7,641,070 B2 | 1/2010 | Ho | |
| 8,012,053 B2 | 9/2011 | Filip | |
| 8,517,389 B2 * | 8/2013 | Okaji | F16C 33/7843 |
| | | | 277/551 |
| 8,591,359 B2 * | 11/2013 | Ward | F16C 13/006 |
| | | | 474/135 |
| 8,777,491 B2 * | 7/2014 | Wang | B60B 27/0005 |
| | | | 384/480 |
| 8,905,879 B2 * | 12/2014 | Lannutti | F16C 13/006 |
| | | | 384/481 |
| 2003/0039422 A1 | 2/2003 | Nisley et al. | |
| 2005/0026729 A1 * | 2/2005 | Schenk | F16C 13/006 |
| | | | 474/101 |
| 2006/0160647 A1 | 7/2006 | Swane | |
| 2006/0188190 A1 | 8/2006 | Schmidl et al. | |
| 2007/0072714 A1 | 3/2007 | Filip | |
| 2009/0286636 A1 | 11/2009 | Serkh et al. | |
| 2010/0133275 A1 * | 6/2010 | Phillips | B65D 7/40 |
| | | | 220/270 |
| 2011/0039648 A1 * | 2/2011 | Lannutti | F16C 13/006 |
| | | | 474/166 |
| 2013/0118853 A1 * | 5/2013 | Champalou | F16H 55/36 |
| | | | 192/56.62 |
| 2013/0217524 A1 | 8/2013 | Antchak et al. | |

FOREIGN PATENT DOCUMENTS

| | | |
|---|---|---|
| CN | 201209628 | 3/2009 |
| JP | 2-116054 | 9/1990 |
| WO | 2013/155615 | 10/2013 |

\* cited by examiner

REUSABLE DUST CAP FOR A PULLEY ASSEMBLY

TECHNICAL FIELD

The present invention relates generally to a dust cap that sealing engages with an opening of a pulley assembly, and more particularly to a reusable dust cap.

BACKGROUND

Pulleys such as drive pulleys (both front-side and back-side), idler pulleys, and tensioner pulleys may be used in a vehicle. Specifically, these pulleys may be used to drive or tension a belt of a drive system. The belt drive system may include a driver pulley and one or more idler pulleys, as well as an endless belt. The pulleys may each include a pulley shell or body having a belt-engaging surface. The endless belt is trained around the belt-engaging surface of each pulley shell.

Each pulley may also include one or more bearings that may be located within a bore of the pulley shell. Sometimes contaminants such as, for example, dust, sand, salt or mud may enter the bearings. These contaminants may increase wear and reduce the life of the bearing. Thus, a dust cap or cover may be provided to substantially prevent contaminants from entering the bore of the pulley body. For example, some types of dust caps may be constructed of plastic. However, these types of plastic dust caps typically have cutouts or other openings that allow dirt and other contaminants to enter the bore of the bearing shell.

Some other types of dust covers currently available may be constructed of a metallic material, such as steel. These types of metallic dust caps substantially prevent the contaminants from entering the bore of the pulley body. However, metallic dust caps may require a relatively high installation force, making these types of dust caps difficult to install. Moreover, these types of metallic dust caps may sometimes damage or puncture the bearing race located within the pulley body during the removal process. Finally, metallic dust caps are typically destroyed when removed from the pulley body.

Other types of dust caps may have a metallic body and an over-molded layer of rubber to act as a seal barrier. These over-molded types of dust caps may be easier to install when compared to a metallic dust cap without the over-molded layer of rubber. However, these over-molded dust caps also have drawbacks as well. For example, the over-molded dust caps are not reusable. Specifically, these over-molded dust caps include a central, rubber portion that is punctured during removal of the over-molded dust cap from the pulley body. Moreover, these over-molded dust caps may be easily damaged during shipping. Thus, the over-molded dust cap typically needs to be shipped separately from the pulley body. Therefore, there exists a need for an improved dust cap for a pulley assembly that overcomes the above-mentioned drawbacks.

SUMMARY

A reusable dust cap is disclosed. In one approach, the dust cap may be used to seal a bore of a rotatable member. For example, the dust cap may be used to seal the bore of a pulley assembly for an accessory drive system.

In one embodiment, a dust cap for sealing engagement with an opening of a member is disclosed. The dust cap is removable from the opening of the member by a tool. The dust cap includes a body and an elastomeric portion. The body defines an outer perimeter, an inner surface, an outer surface, and a recess disposed along the outer surface. The recess is shaped to receive a portion of the tool. The elastomeric portion is located around the outer perimeter of the body. The elastomeric portion is sealingly engageable with the opening of the body member.

The tool may be used by an operator during removal of the dust cap from the opening of the member. Specifically, the dust cap may be removed from the opening without any substantial deformation or damage to either the body or the elastomeric portion of the dust cap. Thus, the dust cap may be manually installed and subsequently removed from the opening multiple times. In other words, the recess enables the dust cap to be reusable.

In another embodiment, a rotatable assembly is disclosed. The rotatable assembly includes a rotatable member having a bore therethrough where the bore defines an opening, and a dust cap. The dust cap is removable from the opening of the member by a tool. The dust cap includes a body and an elastomeric portion. The body defines an outer perimeter, an inner surface, an outer surface, and a recess disposed along the outer surface. The recess is shaped to receive a portion of the tool. The elastomeric portion is located around the outer perimeter of the body. The elastomeric portion is sealingly engageable with the opening of the body member.

In yet another embodiment, a dust cap for sealing engagement with an opening of a member is disclosed. The dust cap is removable from the opening of the member. The dust cap includes a body and an elastomeric portion. The body defines an outer perimeter and an aperture disposed along the outer surface. The elastomeric portion is located around the outer perimeter of the body and defines an outwardly extending projection. The outwardly extending projection is received by the aperture of the body and provides a grasping surface. The elastomeric portion sealingly engaged with the opening of the body member. The outwardly extending projection provides a surface that an operator may grasp. Thus, when the dust cap is removed from the opening, the outwardly extending projection serves as a pull-tab that the operator may grasp and pull upon.

DETAILED DESCRIPTION

The following detailed description will illustrate the general principles of the invention, examples of which are additionally illustrated in the accompanying drawings. In the drawings, like reference numbers indicate identical or functionally similar elements.

Figure 1:
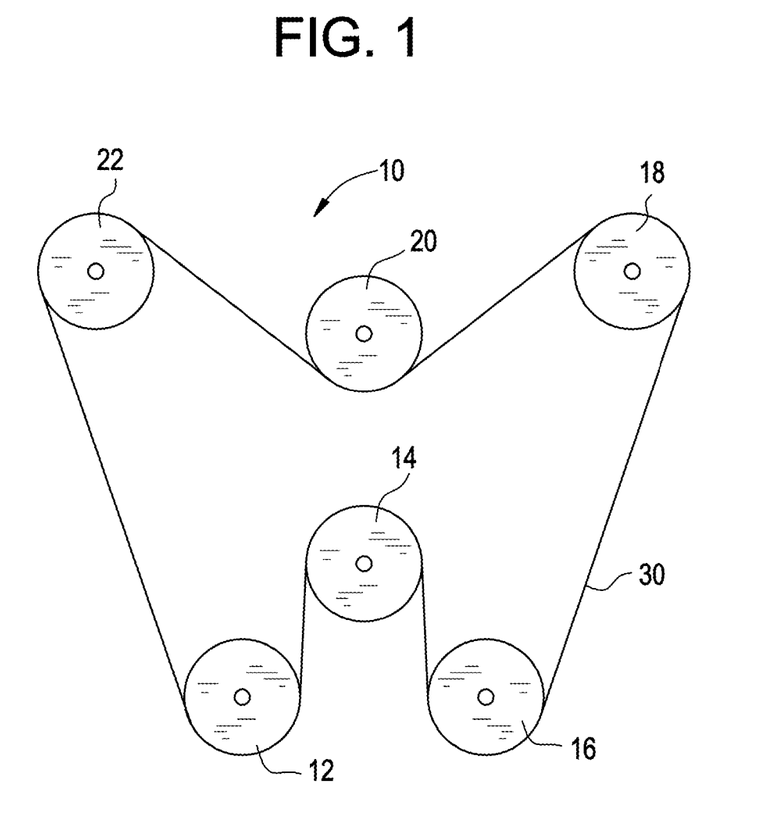
FIG. 1 is a diagrammatic view of an embodiment of an accessory drive system.

Referring now to FIG. 1, an accessory drive system 10 of, for example, an internal combustion engine of a vehicle is illustrated. The accessory drive system 10 includes an endless belt 30 that is used to drive a number of accessories, which are not illustrated in FIG. 1. Instead, the accessories are represented in FIG. 1 diagrammatically by a number of pulley assemblies. Specifically, FIG. 1 illustrates the belt 30 entrained around a crank pulley assembly 12, a fan/water pump pulley assembly 14, an alternator pulley assembly 16, a power steering pulley assembly 18, an idler pulley assembly 20 and a tensioner pulley assembly 22.

The various accessories are driven through use of the pulley assemblies 14, 16, 18, 20 and 22 that are themselves rotated by the belt 30. For purposes of description, the alternator pulley assembly 16 will be focused on below. Although the alternator pulley assembly 16 is described below, those skilled in the art will appreciate that the disclosed dust cap (shown in FIG. 2 as item 56) may be utilized on any of the other pulley assemblies 12, 18, 20 as well. Moreover, it should also be noted that while the embodiments discussed herein disclose the dust cap as part of a pulley assembly for an accessory drive system, it is to be understood that the embodiments are merely exemplary in nature. Those skilled in the art will readily appreciate that the disclosed dust cap may be used in a variety of other applications as well, and may be used to provide sealing to any type of part. For example, in one embodiment the disclosed dust cap may be used in a non-rotatable part, such as a tensioner arm. A tensioner arm may oscillate back and forth, but does not rotate. Indeed, those skilled in the art will appreciate that the disclosed dust cap is not limited to use in rotatable or oscillatory components, and may be used in a static environment as well.

Figure 2:
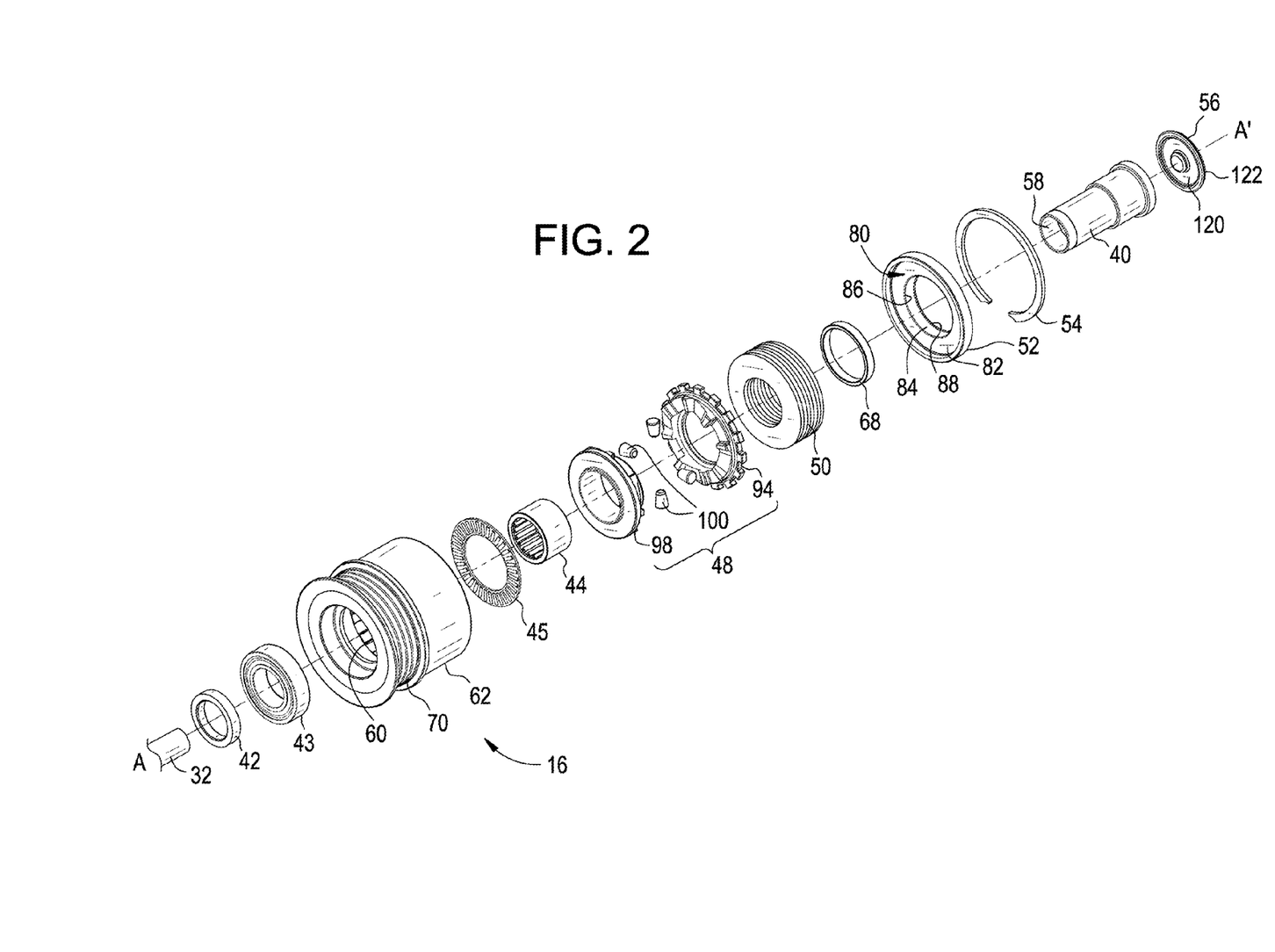
FIG. 2 is an exploded, perspective view of an embodiment of a pulley assembly for use in an accessory drive system such as that illustrated in FIG. 1, where the pulley assembly includes a dust cap.
Figure 3:
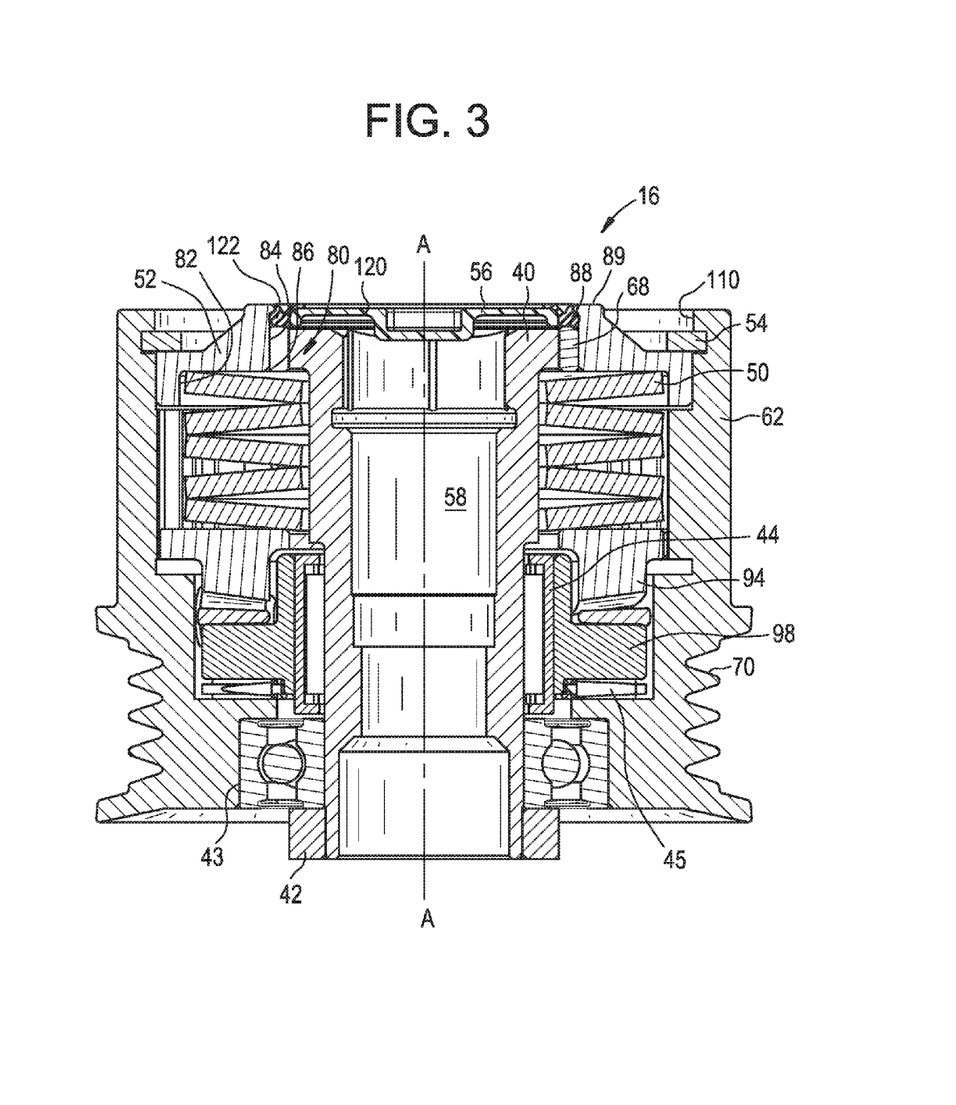
FIG. 3 is a cross-sectioned view of the pulley assembly shown in FIG. 2.

Referring now to FIGS. 2-3, the alternator pulley assembly 16 may be used to selectively transfer input torque from the belt 30 (shown in FIG. 1) to an input shaft 32 of an accessory (e.g., the alternator). In the exemplary embodiment as shown in FIGS. 2-3, the pulley assembly 16 includes a hub 40 that is engageable with the input shaft 32, a spacer 42, a roller bearing 43, a needle bearing 44, a thrust bearing 45, a clutch actuator 48, one or more biasing members 50, a sleeve 52, a retaining ring 54, and a dust cap 56, which are all housed within a bore 60 of a pulley body 62. The hub 40 may define a bore 58 therethrough. The hub 40 may be mated to the input shaft 32 so as to prevent the hub 40 from freely rotating about the input shaft 32. The hub 40 may be mated to the input shaft 32 using any known approach for allowing torque transmission between two rotational elements such as, for example, a Woodruff key (not illustrated).

The pulley body 62 surrounds the hub 40, and the pulley bore 60 is sized such that the pulley body 62 may rotate about the hub 40. The pulley body 62 is rotatable about an axis of rotation A-A. The pulley body 62 may also include an outer, peripheral belt-engaging surface 70 that engages the belt 30 (FIG. 1). The belt engaging surface 70 may be profiled including V-shaped ribs and grooves to mate with corresponding ribs and grooves (not illustrated) on the belt 30. Although FIG. 2 illustrates V-shaped ribs located along the belt engaging surface 70, other features such as cogs, flat or rounded ribs and grooves may be used as well to engage the belt 30.

The sleeve 52 may include a bore 80 therethrough having a stepped configuration. Specifically, the bore 80 may include a first section 82 and a second section 84, where the first section 82 has a larger diameter when compared to the second section 84 of the bore 80. A step 86 may define the transition between the first section 82 and the second section 84 of the bore 80. The first section 82 of the bore 80 may be sized to receive at least a portion of the biasing members 50. In the non-limiting embodiment as shown in FIGS. 2-3, the biasing members 50 are illustrated as a plurality of Belleville washers. However, it is to be understood that any type of biasing member configured to exert a force in an axial direction may be used as well such as, for example, a wave or spiral compression spring.

Figure 4:
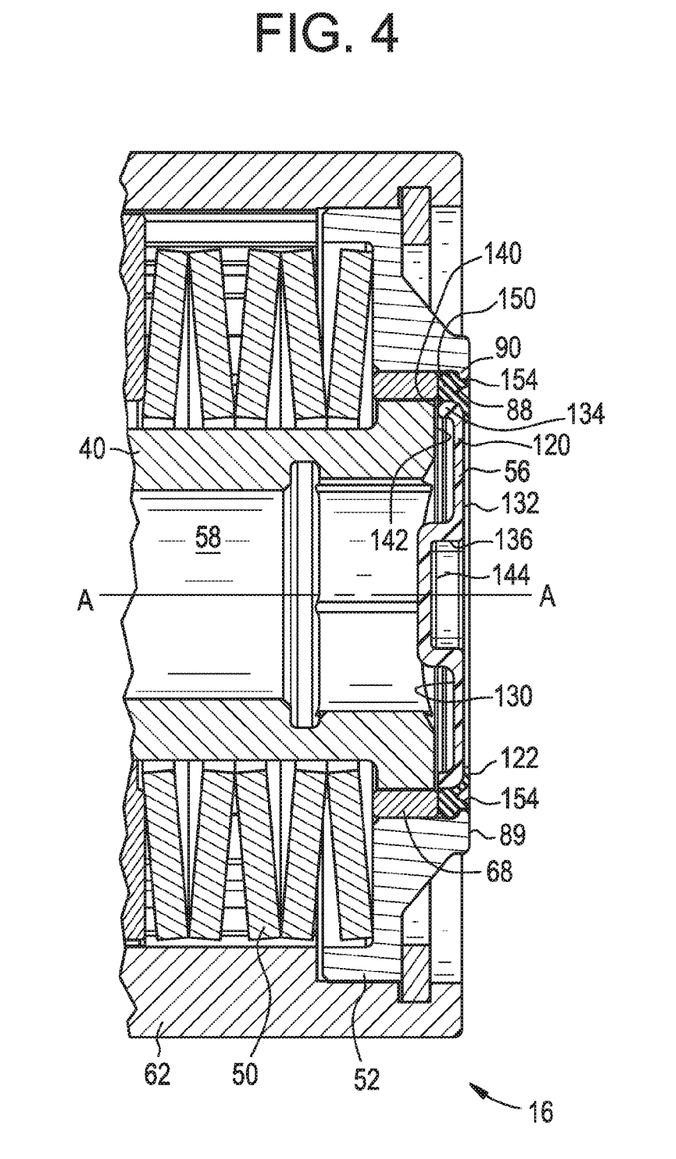
FIG. 4 is an enlarged view of a portion of the pulley assembly shown in FIG. 3.

The second section 84 of the bore 80 may be sized to receive a bushing 68 as well as the dust cap 56. The bushing 68 may be press-fit into the second section 84 of the bore 80. The dust cap 56 may be received within an opening 88 of the sleeve 52. Specifically, the opening 88 of the sleeve 52 may be located along an outer surface 89 of the sleeve 52 (FIG. 3). As best seen in FIG. 4, which is an enlarged view of a portion of the sleeve 52, the opening 88 of the sleeve 52 may define a lip 90 that extends inwardly, and towards the axis A-A of the hub 40.

Referring back to FIGS. 2-3, the clutch actuator 48 may include a ramp construction or a roller-ramp construction that expands axially (i.e., has at least one component that is translatable along an axis of rotation A-A of the alternator pulley assembly 16 to a location further from another component thereof) as a result of rotational movement of at least a portion of the clutch actuator 48. The axial expansion typically is a result of one component moving up or along an inclined feature or moving in response to the movement of a rolling element up or along an inclined feature.

The clutch actuator 48 in the embodiment of FIGS. 2 and 3 includes an upper ramp component 94, a lower ramp component 98, and one or more roller elements 100 enclosed therebetween. The roller elements 100 may be cylinders, balls, generally conical cylinders, or the like. The upper ramp component 94 is generally located adjacent to the biasing members 50. The lower ramp component 98 may be located between the upper ramp component 94 and the thrust bearing 45. Upper and lower are used herein as relative to positions of the components of the pulley assembly 16 as illustrated in FIG. 3 with respect to the orientation of the page. The terms upper and lower are likewise applicable to the other drawings herein.

Referring to FIGS. 3 and 4, the dust cap 56 may be used to seal the opening 88 of the sleeve 52, thereby substantially or completely preventing contaminants from entering the interior of the pulley body 62. Thus, the dust cap 56 may be used to generally protect the components housed within the bore 60 of the pulley body 62, such as the needle bearing 44 and the thrust bearing 45, from contaminants. It should be noted that while FIGS. 3 and 4 illustrate the dust cap 56 sealing the opening 88 of the sleeve 52, those skilled in the art will appreciate that the dust cap 56 may be sized to seal other openings of the pulley assembly 16 as well. For example, in another embodiment, the dust cap 56 may be used to seal an opening 110 of the pulley body 62 (shown in FIG. 3), where the dust cap 56 may be seated above the retaining ring 54.

Figure 5:
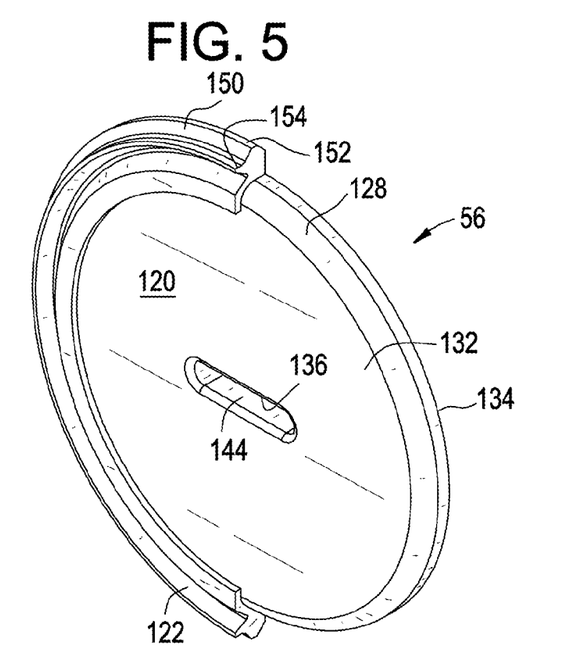
FIG. 5 is a perspective view of the dust cap shown in FIG. 2, where a portion of an elastomeric material has been removed.
Figure 6:
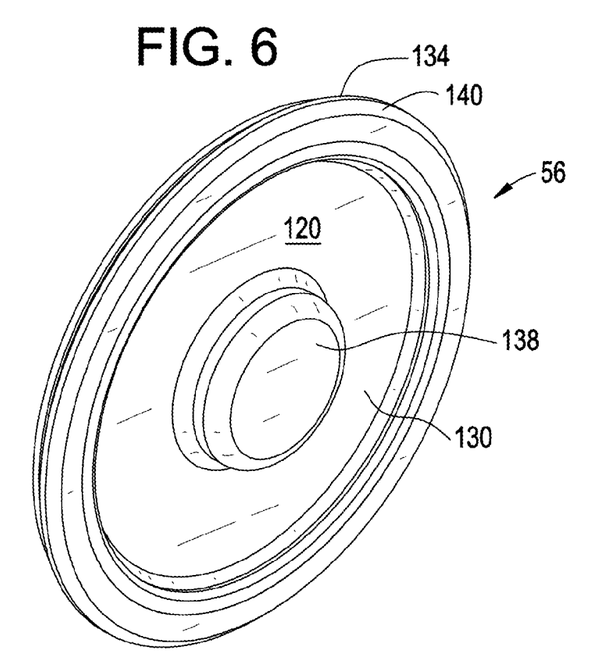
FIG. 6 is another perspective view of the dust cap shown in FIG. 2.

Referring to FIGS. 4-6, the dust cap 56 may include a body portion 120 and an elastomeric portion 122. In the embodiment as shown in FIGS. 4-6, the body portion 120 may be constructed of plastic. However, in the alternative embodiments as shown in FIGS. 7-12 which are described in greater detail below, the body portion 120 may be constructed of a metallic material. Referring back to FIGS. 4-6, the plastic of the body portion 120 of the dust cap 56 may be flexible enough such that installing and removing the dust cap 56 from the pulley assembly 16 does not substantially plastically deform the dust cap 56. Some examples of plastics that possess the flexibility required include, but are not limited to, nylon 6/6 with a glass content of up to about thirty percent, nylon 6, nylon 4/6, or any plastic material where the melting point is greater than the elastomeric member molded over it.

Referring to FIG. 5, a portion of the elastomeric portion 122 has been removed in order to reveal an outer perimeter 128 of the body portion 120 of the dust cap 56. In the exemplary embodiment as shown, the outer perimeter 128 of the dust cap 56 is substantially round or circular. Referring to both FIGS. 5 and 6, the body portion 120 of the dust cap 56 may also include an inner surface 130, and outer surface 132, a lip 134, an engagement feature 136, and a stiffening button 138.

Referring to FIGS. 4-6, the inner surface 130 of the dust cap 56 may face or be received by the opening 88 of the sleeve 52, and the outer surface 132 of the dust cap 56 may be visible once the dust cap 56 is installed to the pulley assembly 16. The lip 134 projects towards the inner surface 130 of the dust cap 56, thereby creating an end surface 140 that may generally oppose an end surface 142 of the hub 40. In one embodiment, the engagement feature 136 may be disposed at a central location along the outer surface 132 of the body portion 120 of the dust cap 56. The engagement feature 136 defines an inwardly extending groove or recess 144 configured to receive a portion of a tool (not illustrated). The tool may be used by an operator to remove the dust cap 56 from the pulley assembly 16. For example, referring specifically to FIG. 5, the recess 144 is shaped as a generally longitudinal slot that is configured to receive an end of a flat-head screwdriver (not illustrated). Although the recess 144 is illustrated in the figures as a longitudinal slot shaped to receive an end of a flat-head screwdriver, those skilled in the art will readily appreciate that the recess 144 may be shaped to receive a variety of tools. For example, in another embodiment, the recess 144 may be shaped to receive a Philips head screwdriver or a hex key.

Referring to FIGS. 4-6, once the dust cap 56 has been installed and seals the opening 88 of the sleeve 52, an operator may subsequently remove the dust cap 56 from the opening using the engagement feature 136. Specifically, in order to remove the dust cap 56 from the opening 88 of the sleeve 52, an operator may insert the tool (e.g., a flat-head screwdriver) into the recess 144 of the dust cap 56. The engagement feature 136 allows the dust cap 56 to be removed from the opening of the sleeve 88 without any substantial deformation or damage to either the body portion 120 or the elastomeric portion 122 of the dust cap 56. Thus, the dust cap 56 may be manually installed to and subsequently removed from the opening 88 of the sleeve 52 multiple times. In other words, the engagement feature 136 enables the dust cap 56 to be reusable.

The stiffening button 138 is located opposite the recess 144 along the outer surface 132 of the body portion 120 of the dust cap 56. The stiffening button 138 may provide stiffness and structural support to the recess 144 of the body portion 120 of the dust cap 56. In one embodiment, the engagement feature 136, or stiffening button 138 may be inserted within a die of a plastic injection molding machine (not illustrated) used to create the body portion 120 of the dust cap 56. The insert may include the molding features needed to form the engagement feature 136, or stiffening button 138. The insert may be removed from the die, and replaced with another insert in order to customize the engagement feature 136. For example, the insert that forms a longitudinal recess for receiving a flat-head screwdriver could be removed and replaced with an insert that forms a recess shaped to receive a hex key.

Continuing to refer to FIGS. 4-6, the elastomeric portion 122 of the dust cap 56 surrounds the outer perimeter 128 of the body, and is configured to sealingly engage with the opening 88 of the sleeve 52. In one non-limiting embodiment, the elastomeric portion 122 of the dust cap 56 may be constructed of a melt processible thermoplastic elastomer (TPE). One commercially available example of TPE is sold under the commercial name SANTOPRENE™, and is available by the ExxonMobil Chemical Company of Houston, Tex.

The elastomeric material may be configured to elastically deform relatively easily when force is applied to the elastomeric portion 122 of the dust cap 56, thereby allowing an operator to manually install the dust cap 56 within the opening 88 of the sleeve 52. Specifically, during installation the elastomeric portion 122 of the dust cap 56 may elastically deform around the lip 90 of the opening 88 before the dust cap 52 is seated within the opening 88. In particular, a sealing bead 150 located along an outer perimeter 152 of the elastomeric portion 122 may elastically deform to fit over the tip 90 located around the opening 88 of the sleeve 52. The sealing bead 150 of the dust cap 56 is subsequently seated within the opening 88 of the sleeve 52 after installation. As seen in FIG. 4, the sealing bead 150 sealingly engages with the opening 88 of the sleeve 52. The elastomeric portion 122 of the dust cap 56 may also include a lip 154 that is positioned adjacent the seating bead 150. The tip 154 is configured to abut against and sealingly engage with the lip 90 located around the opening 88 of the sleeve 52. Thus, both the sealing bead 150 and the lip 154 of the elastomeric portion 122 may substantially prevent contaminants from entering the opening 88 of the sleeve 52.

Although FIGS. 4-6 illustrate the elastomeric portion 122 of the dust cap 56 including the sealing bead 150 and the lip 154, those skilled in the art will appreciate that the elastomeric portion 122 may include any number of features and configurations for sealing. For example, in an alternative embodiment the elastomeric portion 122 of the dust cap 56 may include a double lipped configuration, where the elastomeric portion 122 may be used to seal between a static surface and a dynamic surface. Alternatively, the elastomeric portion 122 of the dust cap 56 may include a double lipped configuration to seal against two static surfaces concurrently.

Referring to FIGS. 5 and 6, in one embodiment the elastomeric portion 122 may be over-molded to the body portion 120 of the dust cap 56. Over-molding is a process where a melt processible elastomer is molded directly onto a rigid component, such as the body portion 120. Those skilled in the art will readily appreciate that if the elastomeric portion 122 is over-molded to the body portion 120, then the body portion 120 of the plastic should include a melt temperature that is higher than the melt temperature of the elastomeric portion 122 such that the plastic material does not generally melt or thermally degrade during the over-molding process.

The body portion 120 and the elastomeric portion 122 may be bonded to another using a variety of different approaches. For example, in the embodiment as shown the elastomeric portion 122 is chemically bonded to body portion 120 of the dust cap 56. Alternatively, or in addition to the chemical bond, the elastomeric portion 122 of the dust cap 56 may also be mechanically bonded to the body portion 120 by one or more gripping features (not illustrated) or anti-rotation features (not illustrated). Although an over-molding process is discussed, those skilled in the art will appreciate that other approaches may be used as well in order to attach the elastomeric portion 122 to the body portion 120 of the dust cap 56. For example, in one embodiment the outer perimeter 128 of the body portion 120 of the dust cap 56 may include a groove (not shown) that receives a portion of the elastomeric portion 122.

Figure 7:
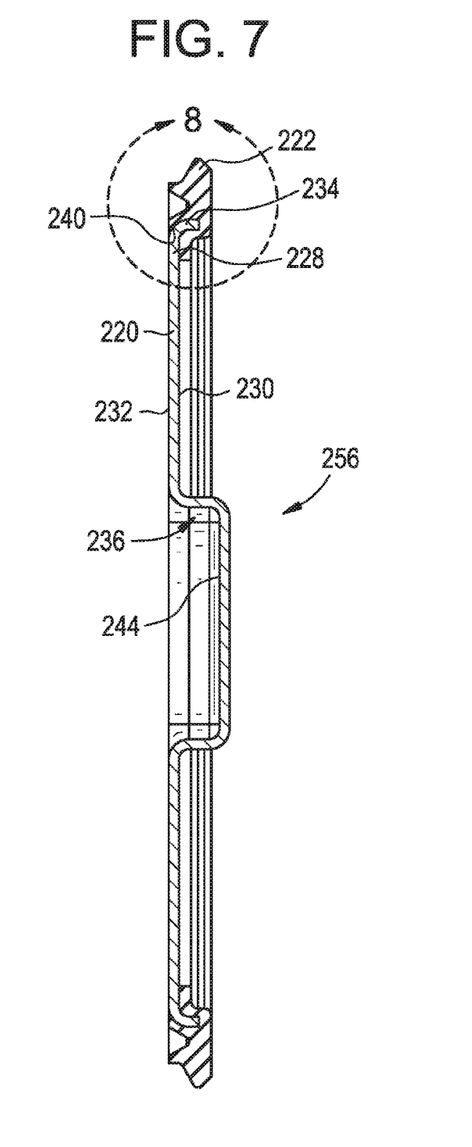
FIG. 7 is a side, cross-sectioned view of an alternative embodiment of the dust cap.
Figure 8:
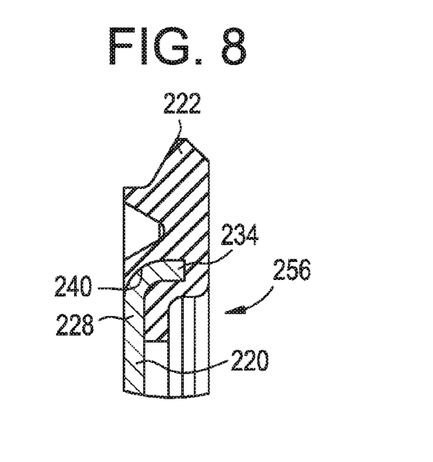
FIG. 8 is an enlarged view of area 8 shown in FIG. 7.
Figure 9:
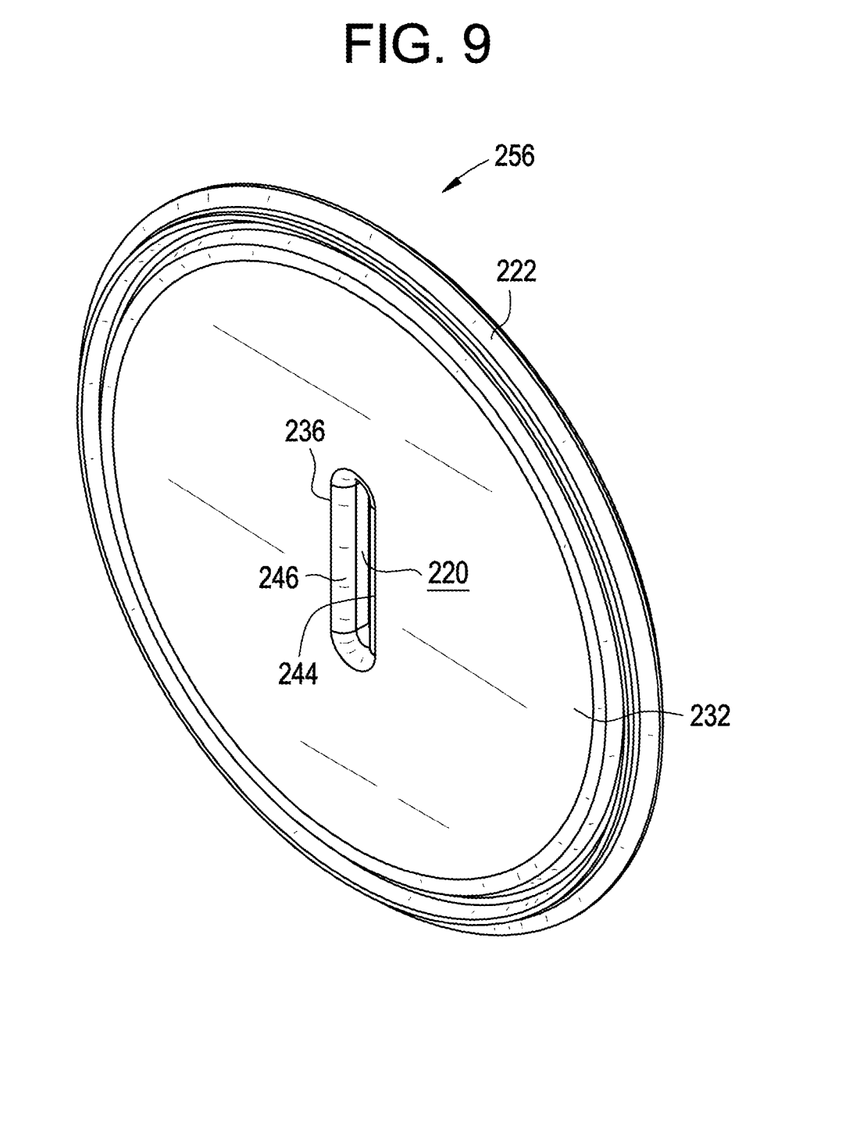
FIG. 9 is a perspective view of the dust cap shown in FIG. 7.

Turning now to FIGS. 7-9, an alternative embodiment of a dust cap 256 is illustrated. Similar to the embodiment as shown in FIGS. 2-6, the dust cap 256 may include a body portion 220 and an elastomeric portion 222. The body portion 220 defines an outer perimeter 228, an inner surface 230, and outer surface 232, a lip 234, and an engagement feature 236. The lip 234 projects towards the inner surface 230 of the dust cap 256. As best seen in FIG. 8, the elastomeric portion 222 includes a recess 240 that is shaped to receive the lip 234 of the body portion 220. Thus, the elastomeric portion 222 is bonded to the body portion 220 of the dust cap 256 using a mechanical bond.

In the embodiment as shown in FIGS. 7-9, the body portion 220 of the dust cap 256 may be constructed of a metallic material. In particular, the metallic material may be malleable enough such that the body portion 220 does not crack or otherwise break during a metal forming process employed to create the engagement feature 236. Some examples of metallic materials that possess the required malleability include, but are not limited to, American Iron and Steel Institute (AISI) 1008 steel, AISI 1010 steel, and galvanized steel.

Similar to the embodiment as shown in FIGS. 2-6, the engagement feature 236 defines an inwardly extending groove or recess 244 configured to receive a portion of a tool (not illustrated). However, those skilled in the art will readily appreciate that the inwardly extending recess 240 typically includes a shorter height, or is shallower when compared to the recess 144 of the dust cap 56 shown in FIGS. 2-6 due to limitations encountered during sheet metal forming. Moreover, as best seen in FIG. 9, the recess 244 may require an inside bend radius 246 that is about the same to as the thickness of the sheet metal that forms the body portion 220 of the dust cap 256.

Referring to FIGS. 7 and 9, in some embodiments a special or customized tool (not illustrated) may be required by an operator to remove the dust cap 256 from the pulley assembly 16 (FIG. 2). A customized tool may be needed because the recess 244 may be too shallow to receive some types of conventional tools such as, for example, a flat-head screwdriver. As explained above, the recess 244 of the dust cap 256 may be too shallow to receive some types of conventional tools because of sheet metal forming limitations.

Figure 10:
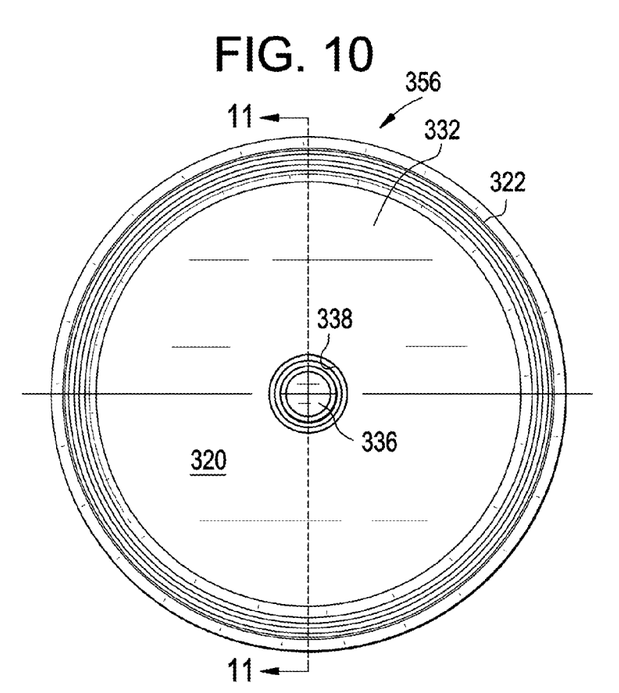
FIG. 10 is a front view of yet another embodiment of the dust cap.
Figure 11:
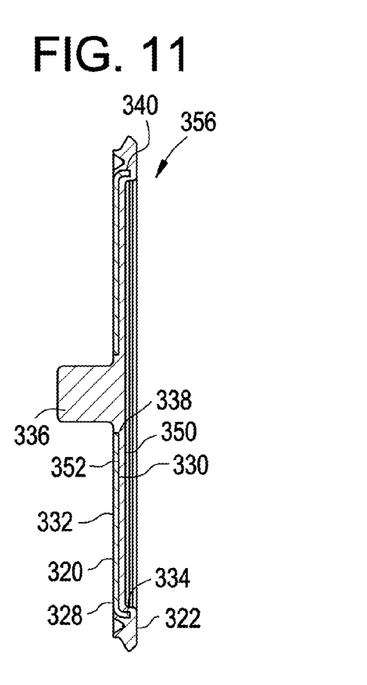
FIG. 11 is a cross sectioned view of the dust cap shown in FIG. 10, taken along section line 11-11.
Figure 12:
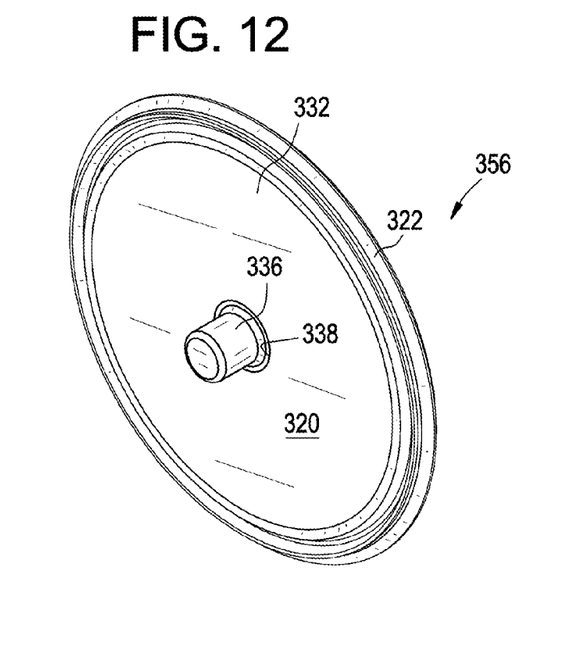
FIG. 12 is a perspective view of the dust cap shown in FIG. 10.

FIGS. 10-12 illustrate yet another embodiment of a dust cap 356. The dust cap 356 may include a body portion 320 and an elastomeric portion 322. In one non-limiting embodiment, the body portion 320 may be constructed of a metallic material such as steel. The body portion 320 defines an outer perimeter 328, an inner surface 330, and outer surface 332, a lip 334, and a centrally located aperture 338. The lip 334 projects towards the inner surface 330 of the body portion 320 dust cap 356. As best seen in FIG. 11, the elastomeric portion 322 includes a recess 340 that is shaped to receive the lip 334 of the body portion 320. Thus, the elastomeric portion 322 is bonded to the body portion 320 of the dust cap 356 using a mechanical bond.

The elastomeric portion 322 of the dust cap 356 defines an outwardly extending projection 336, an inner surface 350 and an outer surface 352. The outer surface 352 of the elastomeric portion 322 generally opposes the inner surface 330 of the body portion 320. The outwardly extending projection 336 is disposed along the outer surface 352 of the elastomeric portion 322, and is received by the aperture 338 located within the body portion 320 of the dust cap 356. As best seen in FIGS. 11-12, the outwardly extending projection 336 may project from the dust cap 356 and provides a surface that an operator may grasp. Thus, when the dust cap 356 is removed from the pulley assembly 16 (FIG. 2), the outwardly extending projection 336 serves as a pull-tab that an operator may grasp and pull upon. Specifically, the operator may pull on the outwardly extending projection 336 in a direction away from the pulley assembly 16 (FIG. 2) to remove the dust cap 356 from the pulley assembly 16 without causing any substantial deformation to either the body portion 320 or the elastomeric portion 322. Thus, the dust cap 356 is also reusable.

Referring generally to FIGS. 1-12, the disclosed dust caps may each be manually installed within the opening 88 of the sleeve 52 of the pulley assembly 16 without the need for any special tools (i.e., an operator may install the dust cap by hand). In the embodiments as shown in FIGS. 2-9, when the dust cap is subsequently removed from the opening 88 of the sleeve 52, an operator may utilize a tool for removing the dust cap from the pulley assembly 16. Thus, the dust caps may be removed without any substantial deformation or damage to either the body portion or the elastomeric portion. In other words, the disclosed dust caps are reusable. In the embodiment as shown in FIGS. 10-12, the disclosed dust cap may be removed from the pulley assembly 16 by pulling on the projection. Moreover, in addition to being reusable, the disclosed dust cap typically requires relatively low force (about 89 Newtons or 20 pounds) to be exerted by an operator during installation. Thus, the dust cap is generally not deformed or otherwise damaged during installation as well.

Finally, in the embodiments as shown in FIGS. 2-6 the disclosed dust cap is constructed of plastic. The plastic dust caps may be installed to the pulley assembly 16 during shipment. Shipping the dust cap along with the pulley assembly may reduce cost and simplify subsequent connection of the pulley assembly 16 to a vehicle.

The embodiments of this invention shown in the drawings and described above are exemplary of numerous embodiments that may be made within the scope of the appended claims. It is contemplated that numerous other configurations of the dust cap may be created by taking advantage of the disclosed approach. In short, it is the applicant's intention that the scope of the patent issuing herefrom will be limited only by the scope of the appended claims.

What is claimed is:

1. A dust cap for sealing engagement with an opening of a member, wherein the dust cap is removable from the opening of the member by a tool, comprising:
   a body defining an outer perimeter, an inner surface, an outer surface, and a recess disposed along the outer surface, the recess shaped to correspond with and receive an end portion of the tool as the dust cap is removed from the opening of the member;
   a stiffening button disposed along the inner surface opposite the recess, wherein the stiffening button provides structural support to the recess; and
   an elastomeric portion located around the outer perimeter of the body, the elastomeric portion sealingly engageable with the opening of the body.

2. The dust cap of claim 1, wherein the body is constructed of plastic.

3. The dust cap of claim 2, wherein the recess receives an end of one of a flat-head screwdriver, a Phillips head screwdriver, and a hex key.

4. The dust cap of claim 2, wherein the plastic is nylon 6/6 with a glass content of no more than about thirty percent.

5. The dust cap of claim 2, wherein the elastomeric portion of the dust cap is over-molded to the body.

6. The dust cap of claim 1, wherein the elastomeric portion of the dust cap defines a sealing bead located along an outer perimeter of the elastomeric portion.

7. The dust cap of claim 6, wherein the elastomeric portion of the dust cap defines a lip positioned adjacent the sealing bead.

8. The dust cap of claim 1, wherein the elastomeric portion is constructed of a thermoplastic elastomer (TPE).

9. A rotatable assembly, comprising:
   a rotatable member having a bore therethrough, wherein the bore defines an opening; and
   a dust cap removable from the opening of the bore by a tool, the dust cap comprising:
      a body constructed of a sheet metal having a thickness, the body defining an outer perimeter, an inner surface, an outer surface, and a recess disposed along the outer surface, the recess shaped to correspond with and receive an end portion of the tool as the dust cap is removed from the opening of the bore, wherein the recess includes an inside bend radius that is about the same as the thickness of the sheet metal; and
      an elastomeric portion located around the outer perimeter of the body, the elastomeric portion sealingly engaged with the opening of the body.

10. The rotatable assembly of claim 9, wherein the elastomeric portion of the dust cap defines a sealing bead located along an outer perimeter of the elastomer portion, and wherein the sealing bead is elastically deformable to fit over a lip located around the opening of the bore.

11. The rotatable assembly of claim 9, wherein the elastomeric portion is constructed of a thermoplastic elastomer (TPE).

* * * * *